Sheet 1, 4 Sheets.
Prentiss & Robertson.
Mash Heater.
N° 49,151.  Patented Aug. 1, 1865.
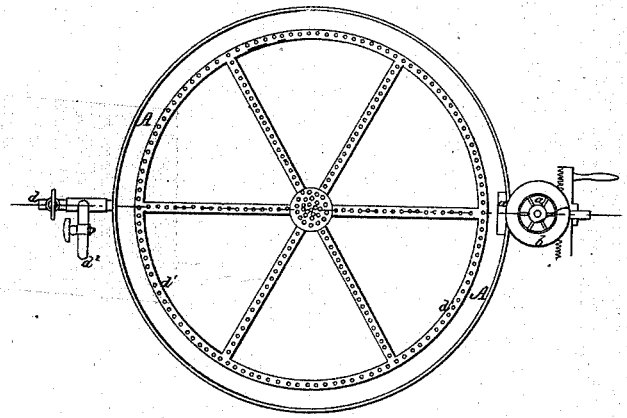
Fig. 1.
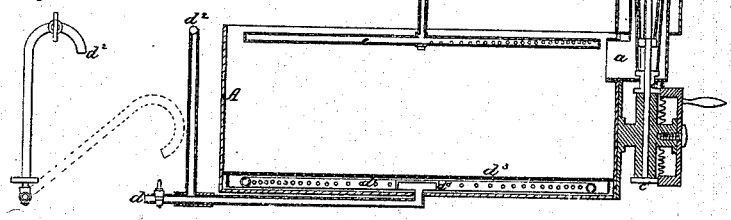
Fig. 3. Fig. 2. 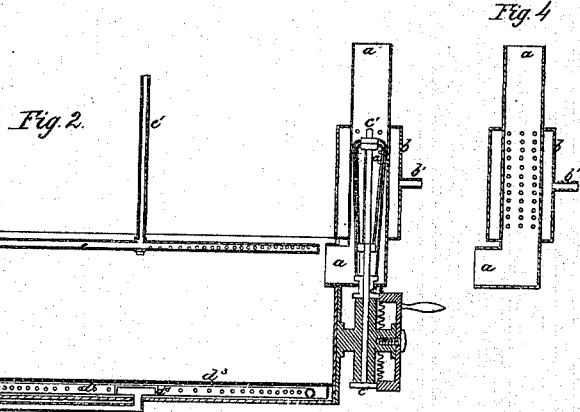 Fig. 4. 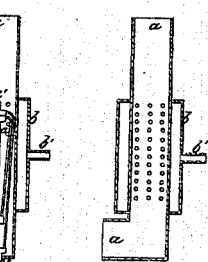
Witnesses:
J. E. Shaw
John Lathrop
Inventors:
Elijah Hunn Prentiss
Robert Adam Robertson Prentiss & Robertson.
Mash Heater.
N°49,151.
Patented Aug. 1, 1865.

Witnesses:
J. E. Sharo
John Lathrop

Inventors:
Elijah Freeman Prentiss
Robert Adam Robertson

Sheet 3, 4 Sheets.

Prentiss & Robertson
Mash Heater.

Nº 49,151.  Patented Aug. 1, 1865.

Witnesses:
J. E. Chad.
John Lathrop.

Inventors:
Elijah Homan Prentiss
Robert Adam Robertson

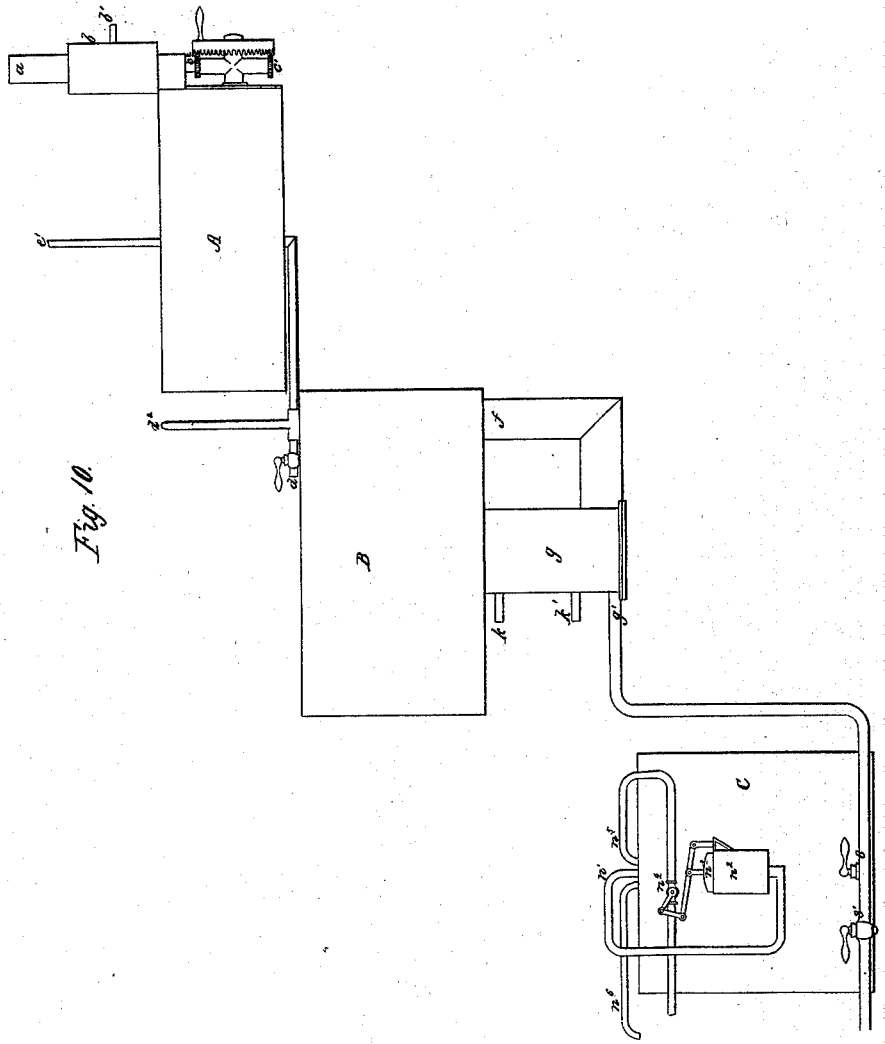

UNITED STATES PATENT OFFICE.

E. F. PRENTISS AND R. A. ROBERTSON, OF PHILADELPHIA, PENNSYLVANIA.

IMPROVED APPARATUS FOR MASHING, BOILING, AND FERMENTING GRAIN.

Specification forming part of Letters Patent No. 49,151, dated August 1, 1865.

*To all whom it may concern:*

Be it known that we, ELIJAH FREEMAN PRENTISS, of the city of Philadelphia and State of Pennsylvania, and ROBERT ADAM ROBERTSON, now of the same place, late of Liverpool, England, have invented certain new and useful Improvements in Apparatus for Making, Boiling, Cooling, and Fermenting Malt-Liquors; and we do hereby declare that the following is a full, clear, and exact description of the same, reference being had to the annexed drawings, in which—

Figure 5:
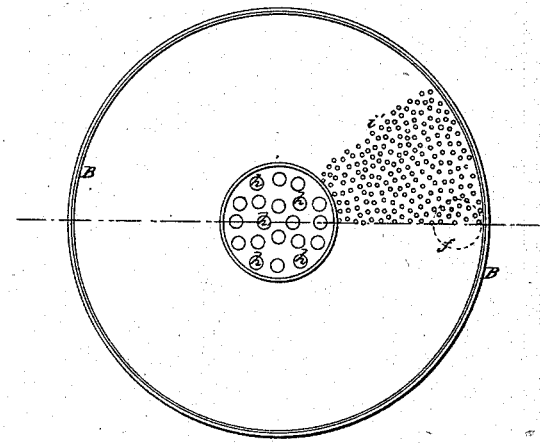
Figure 6:
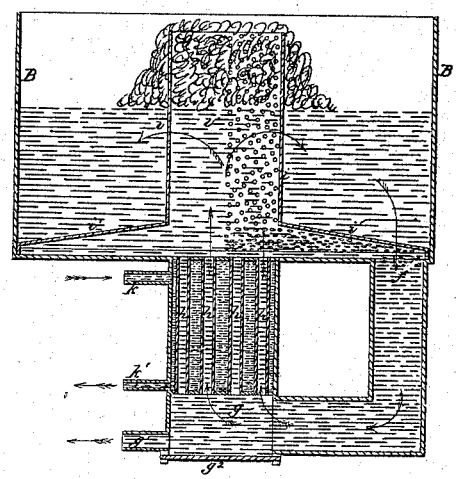
Figure 8:
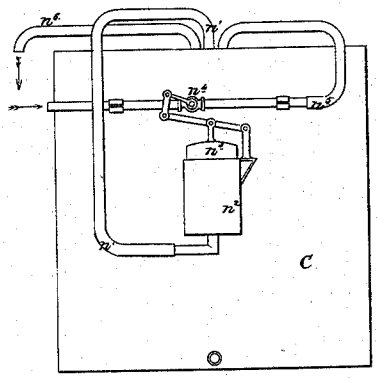
Figure 7:
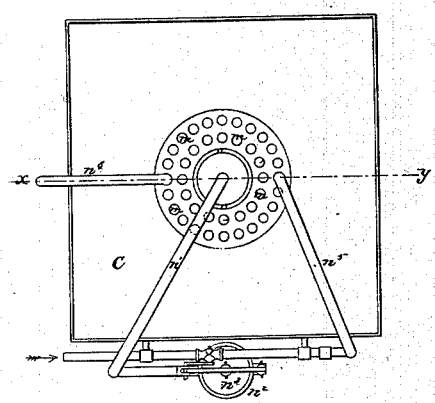
Figure 9:
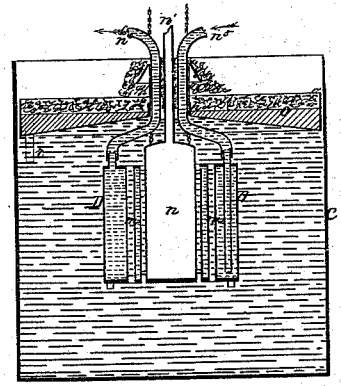

Figure 1 is a top view of the mash-tub, mashing apparatus, and drawing-off tube; Fig. 2, a vertical section of the same; Fig. 3, a detached view of the drawing-off pipe. Fig. 4 is a vertical section of a part of the mashing apparatus, showing the pipe for the influx of the water around about the pipe that brings the malt from the malt-lodge. Fig. 5 is a plan of the boiling and cooling cistern. Fig. 6 is a vertical section of the vessel last mentioned. Fig. 7 is a plan of the fermenting apparatus. Fig. 8 is a front view of the fermenting apparatus, showing a part of the regulating apparatus. Fig. 9 is a vertical section of the fermenting apparatus, taken on the line $x\,y$ in Fig. 7. Fig. 10 is a front view of the mashing, boiling, and cooling and fermenting apparatus in position.

Our improvements may be best described under three heads, as follows:

I. The improvements in the mashing apparatus, which consist, first, in a device for mixing the malt with water outside of the mash-tub; second, in the arrangement and combination of a supply and draw-off pipe with a distributer, which acts also as a strainer placed inside this tub; third, in a revolving sparger, perforated as hereinafter described.

II. The improvements in the boiling and cooling apparatus, which is constructed, arranged, and operated as hereinafter described.

III. The improvements in the fermenting-tun, which consist, first, in a new regulating apparatus; second, an improved float.

To enable others skilled in the art to make and use our improvements, we will proceed to describe their construction and mode of operation.

A, Figs. 1 and 2, is the mash-tub.

$a$, Figs. 2 and 4, is a pipe, perforated as shown, about six inches in diameter, connected with the mash-tub, and through which the ground malt falls in a stream from the malt-lodge, the supply being regulated by an ordinary slide or damper.

$b$ is a casting surrounding the perforated part of the pipe $a$, as shown, having an inlet-pipe, $b'$, communicating with a hot-water cistern, which is placed at an elevation such as will produce sufficient pressure, say, at an elevation of from six to ten feet above the level of the mash-tub. For a mash-tub calculated for a mash of one hundred bushels the perforations in pipe $a$, in the aggregate of their area, must be sufficient to allow the passage of about thirty gallons of water a minute, and the supply-pipe must be of sufficient sectional area to admit, say, forty gallons a minute. The object of so constructing the supply-pipe is to cause the water to pass through the perforations with an impetus.

$c$ is a mixer, which consists of two series of rods, the rods in each series being fastened at top and bottom to separate disks. The stem $c'$ of the mixer passes down through a stuffing-box, $c^2$, and is connected with gearing for revolving the two series of rods, each series in an opposite direction.

$d$, Fig. 2, is a pipe, about two inches in diameter, to admit water to the mash-tub, which communicates with the distributer $d'$, which is placed under the false bottom $d^2$.

$d^2$, Figs. 2 and 3, is an adjustable pipe connected by a swivel-joint to the supply-pipe $d$, to regulate the depth of water on the goods, and which by being turned down far enough drains off all the wort from the mash-tub.

$e$, Fig. 2, is the sparger, connected by a swivel-joint with the pipe $e'$, by which pipe it is suspended, this pipe $e'$ being made of a convenient length, and being connected with hot and cold water supply pipes. (Not represented.) Each arm of the sparger is perforated with holes, the arms of the sparger being divided into an equal number of spaces. In the first space are made three holes, in the second five, in the third seven, in the fourth nine, in the fifth eleven, and so on to the ends of the arms. The first hole in the first space on each arm points directly down, and the last hole at the end of each arm points a little above the quarter of the circle of the pipe. The line of holes from the first to the last in each arm forms a spiral. The object of the construction of the holes in this manner is to secure the distribution of equal quantities of the water over equal spaces of the goods. The sectional area of all the holes is made less than that of the supply-pipe, so that the water can pass through the holes with an impetus.

In Figs. 5 and 6, B is the boiling and cooling vessel. $f$ is a pipe, about one foot in diameter, leading from the bottom of this vessel to the bottom of the column $g$, which is formed of an exterior side case, about ten feet long and two feet in diameter, inclosing a number of pipes, $h$, each about one inch in diameter. The pipes $h$ are arranged in concentric circles around the center pipe. The first circle has a radius of one and three fourths inch and contains six pipes. The second circle has a radius of three and one half inches and contains twelve pipes. The third circle has a radius of five and one-fourth inches and contains eighteen pipes. The fourth circle has a radius of seven inches and contains twenty-four pipes. The fifth circle has a radius of eight and three-fourths inches and contains thirty pipes. The sixth circle has a radius of ten and one-half inches and contains thirty-six pipes. The pipes $h$ are fastened at the top to a perforated plate and at the bottom to another similar plate so as to be in communication with the boiler B and the pipe $f$.

$g^2$ is a plate bolted to the bottom of the column $g$, and is made removable, in order that the pipes $f$ and $h$ can be cleaned.

$i$ is a tubular perforated chimney attached to a perforated false bottom, $i'$, of a conical shape, having an edge of about three inches in depth, which rests on the bottom of the boiling-vessel B.

$k$ and $k'$, Fig. 6, are pipes, of about two inches in diameter, for the inlet and outlet of steam or water to the space surrounding the pipes $h$ in column $g$.

$g'$, Figs. 6 and 10, is the pipe to convey the wort to the fermenting-tuns, of which there may be any desired number. The cock $s$, Fig. 10, communicates with the fermenting-tun $c$, and the cock $s'$ commands the flow of wort to the fermenting-tuns employed.

In Figs. 7, 8, and 9, $c$ is the fermenting-tun, which is about eight feet square in the horizontal section and about eight feet deep.

D is a part of the regulating apparatus, which is suspended from above and immersed in the wort more or less, as desired. It may be lowered even to the bottom when hot water is required. D consists of an outside case, about two feet in diameter and twenty inches high, inclosing a number of pipes, $m$, attached to a perforated plate at the bottom and to another perforated plate at the top, inclosing also an air-chamber, $n$, about eight inches in diameter. This air-chamber $n$ is connected by a pipe, $n'$, Figs. 8 and 9, with the bottom of a cup, $n^2$, fixed to the outside of the tun and containing a quantity of mercury, in which floats an inverted cup, $n^3$, which is connected by a series of levers, as shown, with the cock $n^4$ in the supply-pipe $n^5$.

$n^6$, Figs. 7, 8, and 9, is a pipe for the exit of the water from the regulating apparatus.

O, Fig. 9, is a float made of wood, flat on its upper surface, conical on its under surface, about eight feet square and about ten inches in thickness at the edges, tapering on the under surface from the sides to an aperture of about sixteen inches diameter in the center, where it is about three-quarters of an inch thick. This float being composed of separate pieces of wood the pieces are securely fastened together and the joints made tight by marine glue or other suitable means. In the aperture of the float there is fastened a metallic collar, $p$, about four inches high. There is fitted into this collar another removable pipe of the same diameter, about twelve inches high, having an umbrella-like rim, $q$, fixed to its upper end. The float has fastened around its edges a wooden border, $o'$, extending from the lower edge of the float about ten inches above the upper surface of the float, for the purpose of collecting the barm until it is removed.

$r$ is a pipe, about sixteen inches long and four inches in diameter, placed flush with the upper surface of the float and extending down into the wort, as shown.

The operation of the several parts of our improvements may be described as follows, viz: The ground malt entering the pipe $a$ falls down the same until it meets the water admitted through $b$ and the perforations in the pipe $a$, and is thoroughly mixed by the rotary mixer $c$. It then falls into the mash-tub A in a state of pulp. That process is continued until the malt intended for that brew is used up. The goods remain in the mash-tub until the brewer finds his solution perfected, and if it be necessary to perfect the solution to add heat, hot water is admitted through the pipe $d$, through the distributer $d'$, under the false bottom $d^3$. When the solution is completed the brewer lowers the swan-neck $d^2$ to the right pitch to get the goods of the proper dryness, the wort running into the vessel B. Then the water is turned on the sparger $e$, which revolves and showers an equal quantity of water over each superficial foot of the goods. The brewer keeps the swan-neck at the desired pitch until he has got his length or quantity, deducting the quantity of wort that is retained among the grains. Then he shuts off the water from the sparger and lowers the swan-neck gradually until he gets it below the level of the mash-tub, when all the wort will drain off into the boiling-vessel B. Steam is then admitted through the pipe $k$, and fills all the space marked blue about the pipes in the column $g$. This process continues until the wort boils. Then (or before, if he prefer) the brewer puts the hops into the boiling-vessel outside of the perforated chimney $i$. The wort boils and circulates through the hops down the pipe $f$ and up through the column $g$, as indicated by the arrows, and this boiling is continued as long as necessary. As soon as the wort has been boiled sufficiently the steam is cut off from the pipes $k$ and $k'$ and cold water is admitted through $k'$, it escaping through $k$, the currents of the water and the steam being in reverse directions. When the wort has been sufficiently cooled it is allowed to flow through the pipe $g'$ and the cock $s$ into the bottom of the fermenting-tub $c$, where barm or yeast is added to it, and after an exposure of twelve hours, more or less, as the brewer desires, to the air, the regulating apparatus is suspended in it at the proper depth, the float is then lowered to the surface of the wort, and the connection made good between the pipes $n'$ and the bottom of the cup $n^2$, and between the pipe $n^5$ and the cold-water main, and between the pipe $n^6$ and any waste receptacle, as shown in Fig. 8. When the float is lowered the umbrella-like pipe $q$ is adjusted to its place, and it is kept there until the barm begins to get heavy, when it is removed. Any wort which subsides from the light barm lying on the float runs back into the tub again through the pipe $r$, which extends below the surface of the wort. When the fermentation in the tub has entirely finished, the beer is racked off through the cocks $s$ and $s'$. Here it may be mentioned that any number of fermentation-tuns may be employed, and that if more than one is used, the cock $s'$ is placed in the pipe $g'$, beyond the last one of the series of tuns.

Having thus described our improvements and how we believe the same may be best carried into practical effect, we wish it to be understood that we do not confine ourselves to the precise details, relative proportions, or dimensions hereinbefore described and set forth, as it will be readily seen that the same may be considerably varied without departing from the invention; but

What we claim, and desire to secure by Letters Patent, is—

1. The combination of the perforated malt-supply pipe $a$, the surrounding casing $b$, and the double-rotating mixer $c$ for mashing the malt, the whole arranged and operating substantially as shown and described.

2. The combination of the adjustable pipe $d^2$ with the pipe $d$ leading to the center of the bottom of the mash-tub, and the distributer $d'$, for the double purpose of admitting water to said tub when necessary and for drawing off the wort therefrom.

3. The sparger $e$, perforated as described, and for the purpose specified.

4. The combination and arrangement of the cistern B, pipe $f$, column $g$, and the perforated false bottom $i$, in the manner and for the purpose substantially as described.

5. The employment of the conical perforated false bottom $i'$ and chimney $i$, arranged and constructed substantially in the manner and for the purpose described.

6. The combination of the boiler B, pipe $f$, and column $g$, the latter having pipes $k$ and $k'$ for the entrance and exit of steam or heated water or cold water for alternately heating and cooling the contents of B, the whole constructed, arranged, and operating in the manner and for the purpose substantially as shown and described.

7. The combination of the solid wooden float O with the return-pipe $r$, these parts being constructed, arranged, and operating substantially as shown and described.

8. The employment of the cooling and heating vessel D in connection with the mercury-cup $n^2$, the inverted cup $n^3$, and the system of levers, the several parts being constructed as shown, and the whole arranged and operating substantially in the manner and for the purpose described.

9. The combination and arrangement of the mash-tub A, boiling and cooling cistern B, and fermenting-tun $c$, in the manner described, for the purpose of mashing, boiling, cooling, and fermenting malt-liquors.

ELIJAH FREEMAN PRENTISS.
ROBERT ADAM ROBERTSON.

Witnesses:
J. E. SHAW,
JOHN LATHROP.